United States Patent
Tokunaga et al.

(10) Patent No.: US 6,603,671 B2
(45) Date of Patent: Aug. 5, 2003

(54) SYNCHRONIZED RECTIFIER VOLTAGE STEP DOWN DC-DC CONVERTER AND CONTROL CIRCUIT THEREFOR

(75) Inventors: Norikazu Tokunaga, Hitachi (JP); Kenichi Onda, Hitachi (JP); Takeshi Onaka, Hitachi (JP); Ryouhei Saga, Takasaki (JP); Akihiko Kanouda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/996,807

(22) Filed: Nov. 30, 2001

(65) Prior Publication Data

US 2002/0136030 A1 Sep. 26, 2002

(30) Foreign Application Priority Data

May 23, 2001 (JP) ........................ 2001-153319

(51) Int. Cl.$^7$ .................. H02M 3/335; H02M 7/5387; G05F 1/563
(52) U.S. Cl. .................. 363/17; 363/132; 323/282; 323/284
(58) Field of Search ............................ 363/17, 16, 20, 363/21.04, 21.06, 132, 131, 97, 98; 323/268, 272, 282, 283, 284

(56) References Cited

U.S. PATENT DOCUMENTS

| | | | |
|---|---|---|---|
| 5,414,341 A | * 5/1995 | Brown | 323/268 |
| 5,627,460 A | * 5/1997 | Bazinet et al. | 323/283 |
| 5,886,508 A | * 3/1999 | Jutras | 323/267 |
| 6,166,528 A | * 12/2000 | Rossetti et al. | 323/282 |
| 6,396,716 B1 | * 5/2002 | Liyu et al. | 363/17 |

FOREIGN PATENT DOCUMENTS

| | | | |
|---|---|---|---|
| JP | 11235922 A | | 8/1999 |
| JP | 112335922 A | * | 8/1999 |

* cited by examiner

Primary Examiner—Rajnikant B. Patel
(74) Attorney, Agent, or Firm—Crowell & Moring LLP

(57) ABSTRACT

A DC-DC converter is provided with a calculation circuit which estimates current flowing through a reactor in a control circuit for controlling a switching element and a circulation use element, and the switching element and the circulation use element are controlled by making use of the calculated reactor current value. Thereby, a DC-DC converter which operates in a high efficiency and with low ripple even during a light load condition and realizes a high response performance during load variation is provided.

22 Claims, 8 Drawing Sheets

SYNCHRONIZED RECTIFIER VOLTAGE STEP DOWN DC-DC CONVERTER AND CONTROL CIRCUIT THEREFOR

BACKGROUND OF THE INVENTION

1. Field of the Invention

The present invention relates to a synchronized rectifier type DC-DC converter and, in particular, relates a voltage step down type DC-DC converter which uses, for example, PWM operation and includes a reverse flow preventing means of such as switching elements and circulating use elements without detecting current value of a reactor, and a control circuit therefor.

2. Conventional Art

A voltage step down synchronized rectifier type DC-DC converter is used as a power source for a variety of information equipment. A variety of techniques for improving conversion efficiency of such devices during light load have been carried out. JP-A-11-235022 (1999) discloses a synchronized rectifier circuit which prevents a reverse flow of reactor current. As shown in FIG. 11, the circuit is constituted by a switching element 51, a circulation use switching element 52, a diode 53, a reactor 3, a capacitor 4, a reactor current detection circuit 501 and a control circuit 502. The reactor current detection circuit 501 monitors the reactor current, and when a tendency toward reverse current is detected, it commands the control circuit 502 to interrupt the circulation use switching element 52. Further, the reactor current detection circuit 501 comprises, for example, a resistor connected in series with the reactor.

In the conventional power source the reactor current is monitored and when a reverse current flow tends to occur, the circulation use switching element 52 is interrupted to prevent a reverse flow. In this manner, diminution of conversion efficiency under a light load condition may be prevented; however, the circuit requires a detection circuit such as a resistor connected in series with the reactor 3. Further, in the conventional power source only a reverse flow of the reactor current is prevented, but the current value of the reactor is not controlled; therefore, a ripple in the output voltage during a light load can not be reduced.

SUMMARY OF THE INVENTION

An object of the present invention is to provide a DC-DC converter and a control circuit which controls the DC-DC converter with a high efficiency and a low ripple during light load conditions without detecting the reactor current or an equivalent thereof, and realizes a high response performance during a load variation.

FIG. 1 shows the structure of a converter according to a first aspect of the present invention, in which main conversion circuit includes a switching element 1, a circulation use switching element 2, a reactor (inductance) 3, a capacitor 4 and an output current detector 5. This is a synchronized rectifier and voltage step down type converter which converts an input DC voltage to a predetermined output value. A control circuit 200 as shown in FIG. 1 is provided with a calculation circuit which calculates the reactor current from detected values of output voltage and current, and controls the converter operation with the calculated value of the reactor current. According to a first aspect of the present invention, the switching element 1 and the circulation use switching element 2 in the converter can be properly controlled without detecting the reactor current (or equivalent thereof) such as with the reactor and the circulation use switching element. In this manner, the conversion efficiency can be enhanced and the ripple can be reduced.

FIG. 2 shows the structure of a converter according to a second aspect to the present invention. A control circuit 200a in FIG. 2 is provided with a calculation circuit which calculates a reactor current and a capacitor internal voltage from detected values of the output voltage and current, and controls the converter operation with the calculated value of the reactor current and the calculated value of the capacitor internal voltage. Further, frequency control is performed, which provides an "on" interval for controlling the calculated value of the reactor current in relation to the output current, and an "off" interval for controlling the calculated value of the capacitor internal voltage in relation to a reference potential. According to the structure of the second aspect of the present invention, ripple effects can be reduced during a light load condition and an efficiency enhancement can be realized.

DETAILED DESCRIPTION OF THE PREFERRED EMBODIMENTS

Hereinbelow, embodiments of the present invention will be explained in detail with reference to the drawings.

Embodiment 1

Figure 1:
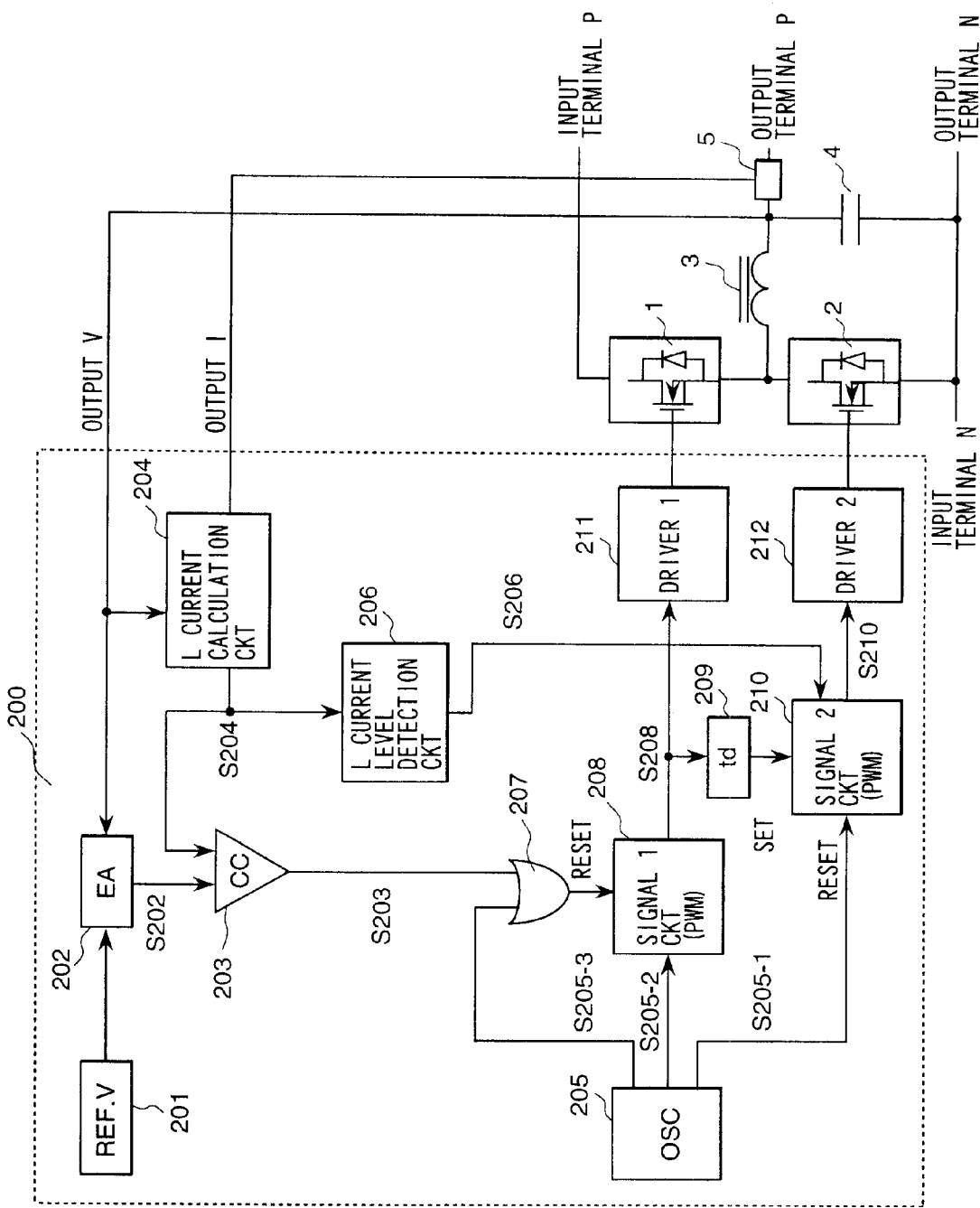
FIG. 1 is a structural diagram of a converter representing a first embodiment of the present invention.

FIG. 1 shows the structure of an embodiment of a converter according to the present invention. In FIG. 1, numeral 1 is a switching element, 2 a circulation use switching element, 3 a reactor, 4 a capacitor, 5 an output current detector and 200 a control circuit. The main converter circuit thereof is a synchronized rectifier type converter in which, between DC input terminals P and N, the switching element 1 and the circulation use switching element 2 are connected in series. The reactor 3 and the capacitor 4 are connected in series between the junction of the switching element 1 and the circulation use switching element 2, and a low potential terminal N of DC input.

The control circuit 200 detects the output voltage and the output current, controls the switching element 1 and the circulation use switching element 2, converts a DC voltage applied between the input terminals P and N into a desired DC voltage and outputs the same at the output terminals P and N. The control circuit 200 is provided with a reference voltage 201, an error amplifier (hereinbelow abbreviated as EA) 202, a current comparator (hereinbelow abbreviated as CC) 203, a reactor current calculation circuit (hereinbelow abbreviated as L current calculation circuit) 204, an oscillation circuit (hereinbelow abbreviated as OSC) 205, a reactor current level detection circuit (hereinbelow abbreviated as L current level detection circuit) 206, an OR circuit 207, a drive signal forming circuit (hereinbelow abbreviated as signal 1 circuit) 208 for the switching element 1, a delay circuit 209, a drive signal forming circuit (hereinbelow abbreviated as signal 2 circuit) 210 for the circulation use switching circuit 2, a driver (hereinbelow abbreviated as driver 1) 211 for the switching element 1 and a driver (hereinbelow abbreviated as driver 2) for the circulating use switching element 2.

Figure 6:
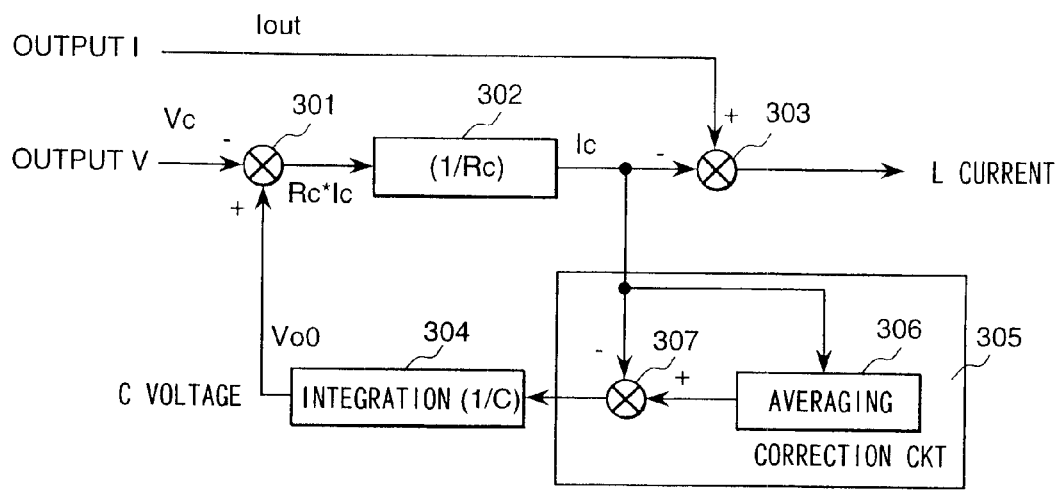
FIG. 6 is a diagram showing a structure of a reactor current calculating circuit representing a sixth embodiment of the present invention.
Figure 9:
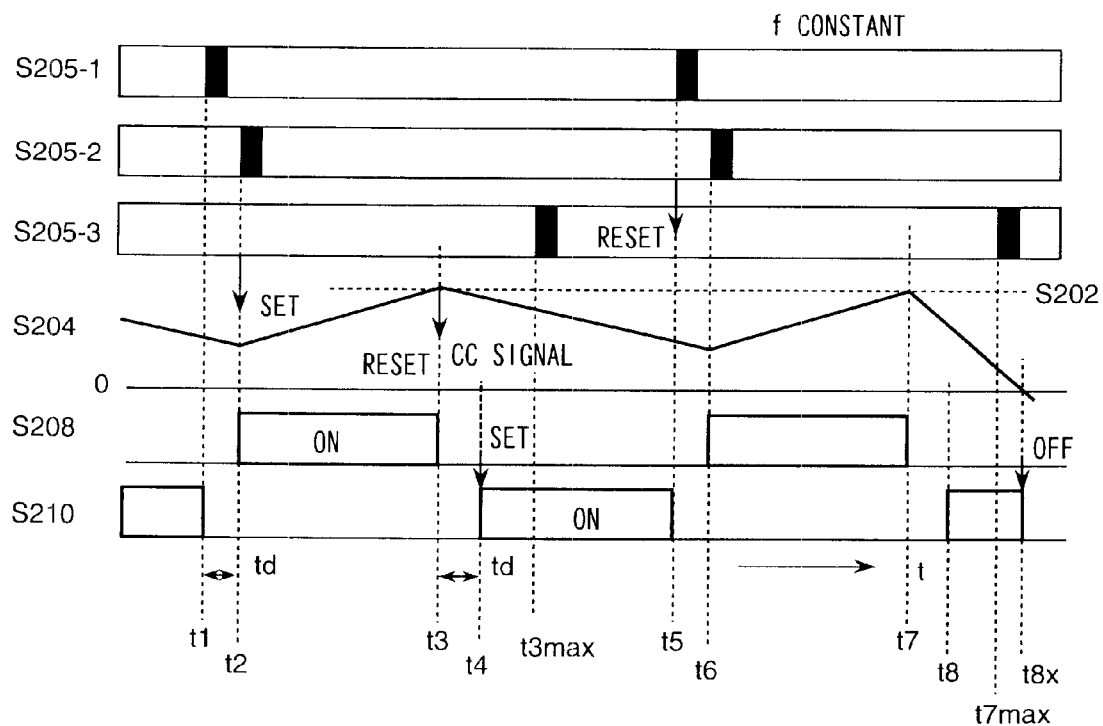
FIG. 9 is a view for explaining operation of a converter of the present invention during a normal load condition.

FIG. 9 shows a set of graphs for explaining operation of FIG. 1 during a normal load condition. The error amplifier 202 compares the detected output voltage with the reference voltage 201, forms an error signal S202 and applies the same to the current comparator 203. The reactor current calculation circuit 204, which is provided with the detected output voltage and output current, performs a calculation to estimate current flowing in the reactor 3 as shown in FIG. 6 (explained later), and applies a calculated reactor current signal S204 to the current comparator 203 and to the reactor current level detection circuit 206.

The current comparator 203 compares the error signal S202 and the calculated value S204 as shown in FIG. 9, forms a reset signal S203 at a time point t3 when the calculated reactor current signal S204 exceeds the error signal S202, and outputs it to the signal 1 circuit 208 via the OR circuit 207. The oscillation circuit 205, which has a fixed frequency, outputs a signal S205-1 at time point t1, a signal S205-2 at time point t2 delayed by time td from t1 and a signal S205-3 at time point t3max (which determines the maximum current conducting interval) and applies them respectively to the signal 2 circuit 210, the signal 1 circuit 208 and the OR circuit 207.

The signal 1 circuit 208 forms a signal S208 which is turned on by the signal S205-2 and is turned off by the signal S203 or S205-3 applied from the OR circuit 207, and drives the switching element 1 via the driver 211 for the switching element 1.

The signal 2 circuit 210 forms a signal S210 which turns on at time point t4 delayed by time td following the ending of the signal S208 at time point t3, and is turned off by a signal S205-1 at time point t5, which is delayed by a one cycle from t1 as shown in FIG. 9. This signal S210 drives the circulation use switching element 2 via the driver 212 for the circulation use switching element 2. The L current level detection circuit 206 applies the signal S206 to the signal 2 circuit 210 when the level of the calculated value S204 is less than a predetermined value, for example, at time point t8x as shown in FIG. 9 and turns off the output signal S210.

According to the converter of the present embodiment using the control circuit 200, the output voltage control can be performed by the current value calculated by the L current calculation circuit, thereby, a stable DC power can be output, further, a reverse current preventing control of the circulation use switching element can also be performed, thereby, the conversion efficiency can be enhanced.

Embodiment 2

Figure 2:
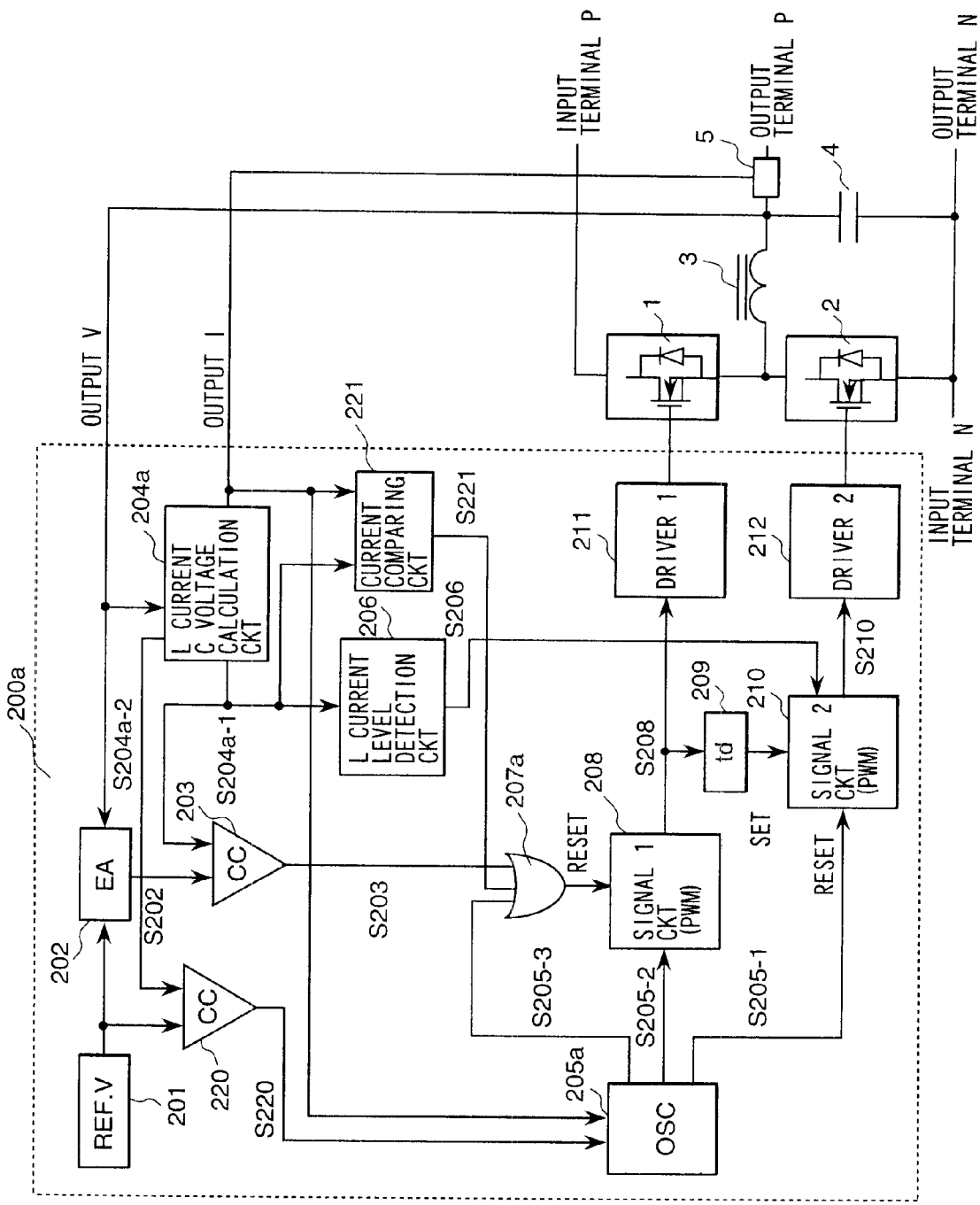
FIG. 2 is a structural diagram of a converter representing a second embodiment of the present invention.

FIG. 2 shows a converter of the present embodiment. In FIG. 2, the circuit constitutional elements designated by the same reference numerals as in FIG. 1 are the same constitutional elements as in FIG. 1 and operate in the same manner.

Differences of FIG. 2 control circuit 200a from FIG. 1 control circuit 200 are that the reactor current calculation circuit 204 is replaced by an L current C voltage calculation circuit 204a, the oscillation circuit 205 is replaced by an oscillation circuit 205a and the OR circuit 207 is replaced by an OR circuit 207a; in addition, a comparing circuit 220 and a current comparing circuit 221 are newly added. The control circuit 200a of the present embodiment operates in the same manner as the control circuit 200 of the first embodiment when the output current is above the predetermined value.

The L current C voltage calculation circuit 204a calculates the reactor current and the capacitor internal voltage, and outputs an L current signal S204a-1 and a C voltage signal S204a-2 which will be explained later with reference to FIG. 6. The signal S204a-1 is applied to the current comparator 203, the L current level circuit 206 and the current comparing circuit 221, and the signal S204a-2 is applied to the comparing circuit 220. The current comparing circuit 221 compares the L current value S204a-1 with a processed value determined by multiplying the output current by a predetermined rate of n times, forms a signal S221 at time point t3 when the signal S204a-1 exceeds the processed value and applies the same to the signal 1 circuit 208 via the OR circuit 207a to turn off the signal S208. At time point t4 when the L current falls below the predetermined value the signal S210 is turned off so as to prevent a reverse current flow of which operation is as same as one at time point t8x as shown in FIG. 9.

Figure 10:
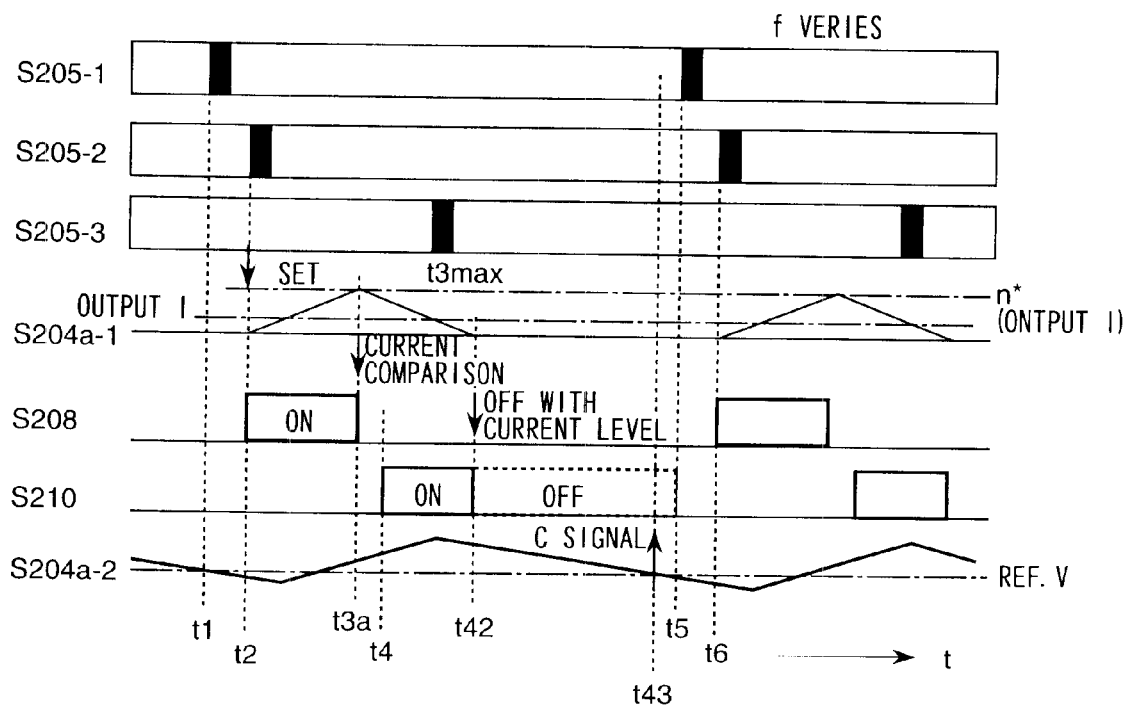
FIG. 10 is a view for explaining operation of a converter of the present invention during a light load condition.
Figure 11:
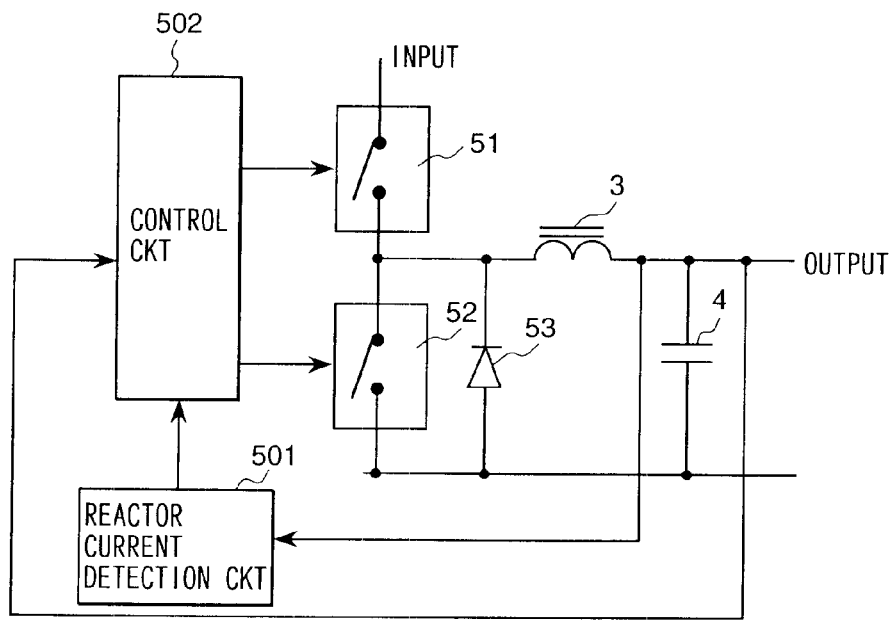
FIG. 11 is a structural diagram of a conventional art converter.

The comparing circuit 220 compares the signal S204-2 with the reference voltage 201, forms a signal S220 at time point t43 when the signal S204-2 drops below the reference voltage and applies the same to the oscillation circuit 205a. The oscillation circuit 205a changes over an internal trigger signal of a fixed frequency for forming the signal S205-1 into the signal S220 at time point t43 when the output current is below a predetermined value to make the frequency variable as shown in FIG. 10.

According to the present embodiment using the control circuit 220a, a stable DC power is output through an output voltage control corresponding to the first embodiment. When the output current is above the predetermined value, and when the output current is below the predetermined value, the amplitude of the reactor current is controlled depending on the load value and the operation is performed at a frequency so as to keep the output voltage at the predetermined value. In this manner, a low ripple and high response performance can be obtained and a converter with a high efficiency can be realized. Further, the predetermined rate n forming the processed value from the output current of the current comparing circuit 221 can be varied depending on the output current to thereby realize a further lower ripple and a higher response performance.

Embodiment 3

Figure 3:
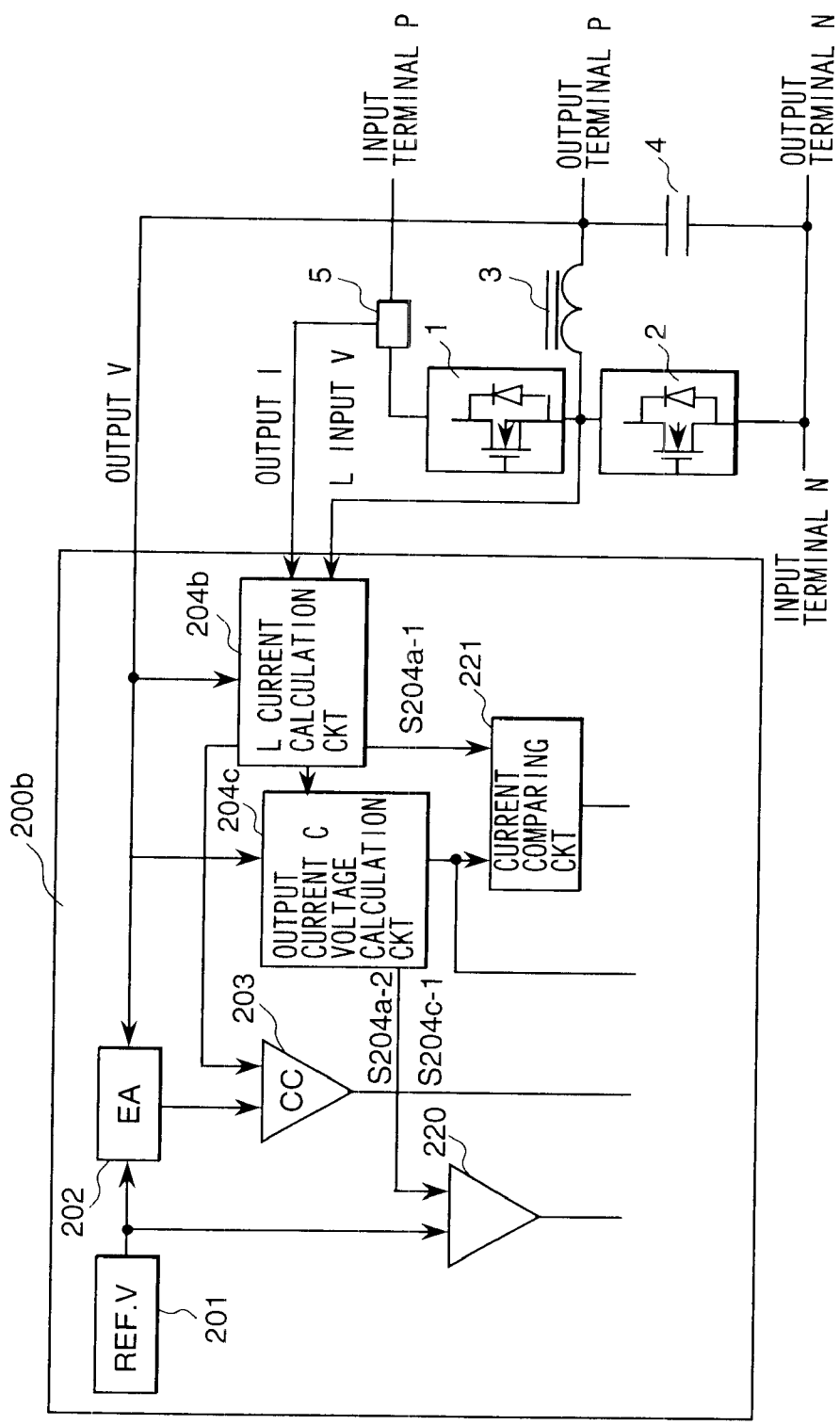
FIG. 3 is a structural diagram of a converter representing a third embodiment of the present invention.

FIG. 3 shows a converter of another embodiment. In FIG. 3, the circuit elements designated by the same reference numerals as in FIG. 2 are the same as those in FIG. 2 and perform the same operations. Differences of FIG. 3 control circuit 200b from FIG. 2 control circuit 200a are that the L current C voltage calculation circuit 204a is replaced by an L current calculation circuit 204b, the input signal is replaced by an input current which is detected from the output current with a detector 5a and a reactor input voltage (hereinbelow abbreviated as L input voltage) is added.

The reactor current calculation circuit 204b calculates reactor current (hereinbelow abbreviated as L current) from a reactor voltage determined by the reactor input voltage and output voltage and the input current, and outputs a signal S204a-1. The signal S204a-1 of the calculated L current value, like the control circuit 200a in FIG. 2, is applied to the current comparator 203 and the current comparing circuit 221, and also to an output current and capacitor internal voltage calculation circuit (hereinbelow abbreviated as output current C voltage calculation circuit) 204c. The output C voltage calculation circuit 204c calculates the output current and the capacitor voltage from the signal S204a-1 and the output voltage, and outputs signals 204a-2 and 204c-1. The signal S204a-2 of the calculated capacitor voltage value is applied, like the control circuit 200a, to the comparing circuit 220. The signal S204c-1 of the calculated output current value is applied, like the control circuit 200a, to the current comparing circuit 221 and the oscillation circuit 205a. The present embodiment using the control circuit 200b performs a control which is similar to that of the second embodiment converter, with the only difference being the detection signal and the calculation circuit from the control circuit 200a.

Embodiment 4

Figure 4:
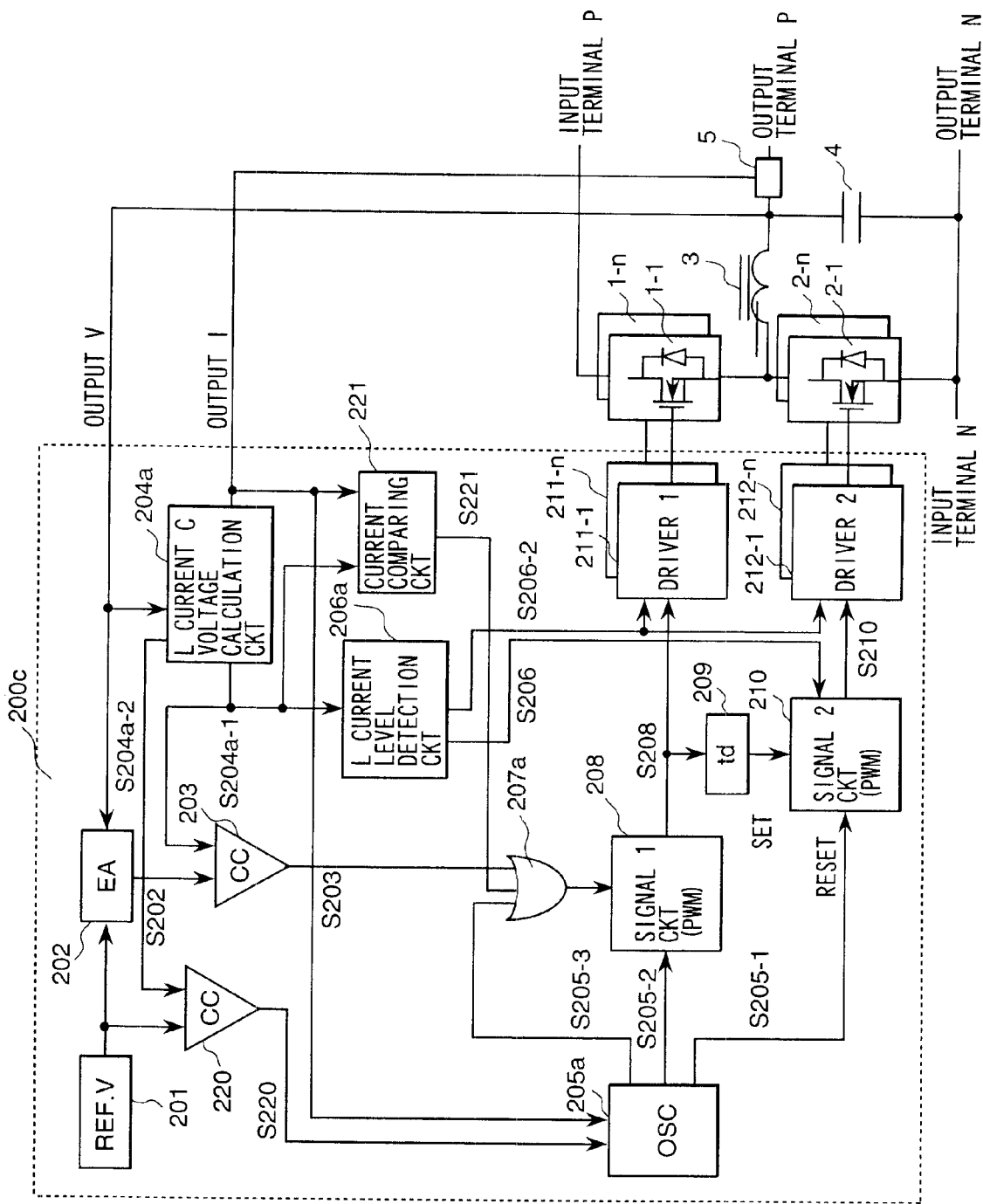
FIG. 4 is a structural diagram of a converter representing a fourth embodiment of the present invention.

FIG. 4 shows a converter of another embodiment. In FIG. 4, the circuit elements designated by the same reference numerals as in FIG. 2 embodiment are the same as those in FIG. 2 and perform the same operations. The differences of FIG. 4 control circuit 200c from FIG. 2 control circuit 200a are that the L current level detection circuit 206 is replaced by an L current level detection circuit 206a, and as the driver 211 for the switching element 1 a plurality of drivers 211-1 211-n, as the driver 212 for the circulation use switching element 2 a plurality of drivers 212-1 212-n, further, as the switching element 1 in the main circuit n pieces of switching elements 1-1 1-n and as the circulation use switching element 2 n pieces of circulation use switching elements 2-1 2-n are respectively provided.

The L current level detection circuit 206a detects reactor current level, forms a signal S206-2 for selecting the switching elements 1-1 1-n and 2-1 2-n which are caused to operate depending on the load condition and selects drivers 211-1 211-n and 212-1 212-n performing operation correspondingly. The converter of the present embodiment using the control circuit 200c increases or decreases the number of drivers and switching elements to be driven depending on the load, thereby, the efficiency under a light load region is enhanced.

Figure 5:
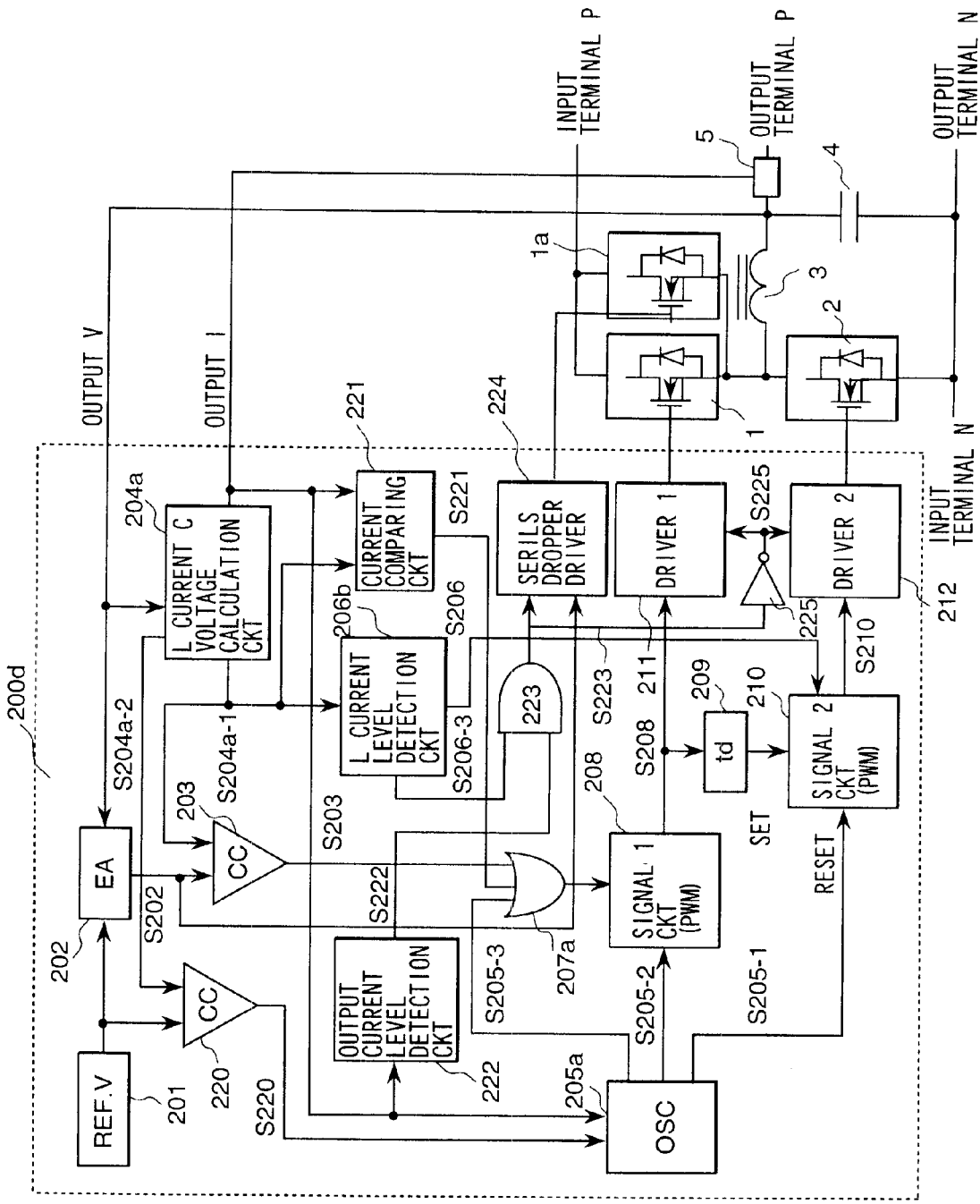
FIG. 5 is a structural diagram of a converter representing a fifth embodiment of the present invention.

FIG. 5 shows a converter of still a further embodiment. In FIG. 5, the circuit elements designated by the same reference numerals as in FIG. 2 the same as those in FIG. 2 and perform the same operations. The differences of FIG. 5 control circuit 200d from FIG. 2 control circuit 200a are that the L current level detection circuit 206 is replaced by an L current level detection circuit 206b, and an output current level detection circuit 222, an AND circuit 223, an INV circuit 225 and a series dropper driver 224 are newly provided. Further, an additional switching element 1a is in addition provided in the main circuit.

The L current level detection circuit 206b detects a reactor current level and outputs a signal S206-3 during a light load condition. The output current level detection circuit 222 detects an output current level and outputs a signal S222 during a light load condition. The AND circuit 223 outputs a signal S223 when the signals S206-3 and S222 are applied thereto, and applies the same to the INV circuit 225 and the series dropper driver 224. The INV circuit 225 outputs a signals 225 when the signal S223 is applied thereto, and stops drive operation of the driver 211 for the switching elements 1 and the driver 212 for the switching element 2.

When the signal S223 is applied, the series dropper driver 224 drives the switching element 1a by making use of the signal S202 applied from the error amplifier 202 and performs a series dropper operation. The converter of the present embodiment using the control circuit 200d performs a series dropper operation during a light load condition to thereby enhance the efficiency.

Further, in the present embodiment such as the operation drivers 211-1 211-n and 212-1 212-n and the switching elements 1-1 1-n and 2-1 2-n as shown in FIG. 4 can also be introduced thereby to enhance the efficiency over a broad load range. Further, the connecting terminal of the output current detector 5 is not limited to the side of the output terminal P, but can be changed to the side of the output terminal N.

Embodiment 6

FIG. 6 shows a structure of a reactor current calculation circuit of a further embodiment. In FIG. 6, 301, 303 and 307 are subtracters, 302 a coefficient circuit, 304 an integration circuit, 305 a correction circuit and 306 an averaging circuit. The reactor current calculation circuit detects an output voltage Vc and an output current Iout and calculates a reactor current and a capacitor internal voltage Vco. Herein, the capacitance of the capacitor is assumed as C and the resistance component thereof as Rc. A difference between Vco and Vc is determined by the subtractor 301. The determined value corresponds to the product of the resistance component Rc and the capacitor current Ic. When passing the output value of the subtractor 301 through the coefficient circuit 302 having the gain of 1/Rc, Ic is obtained. The difference between the output current Iout and Ic is determined by subtractor 303, and thereby L current is obtained.

Further, when integrating Ic by the integrator 304 having the gain of 1/C after passing through the correction circuit 305, the capacitance internal voltage Vco can be obtained. Because the polarity of the signals which the subtracters deal depends on designated polarities of the respective signals, if the polarity of the signals is reversed the result will be of course different.

The correction circuit 305 determines an average value of Ic through the averaging circuit 306 and determines a difference between Ic and the determined average value, and corrects the steady state value of C voltage with Ic by nulling the steady state value of the capacitor charging and discharging current. In this manner, without directly detecting the reactor current and capacitor internal voltage, the same are determined through calculation and are used for control. Further, it is also possible to modify the circuit so that the steady state value of the capacitor charging and discharging current in the correction circuit 305 and the steady state value of the difference between Vc and Vco are rendered zero.

Embodiment 7

Figure 7:
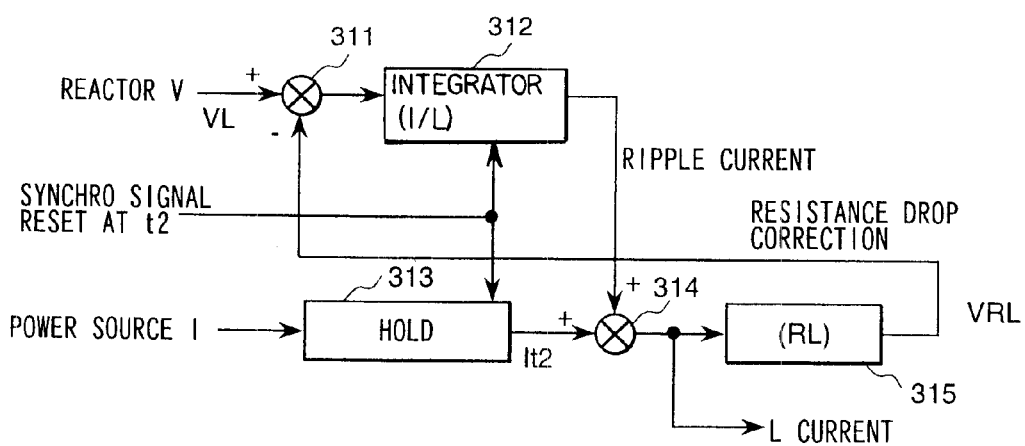
FIG. 7 is a diagram showing a structure of a reactor current calculating circuit representing a seventh embodiment of the present invention.

Finally, FIG. 7 shows a structure of a reactor current calculation circuit of another embodiment. In FIG. 7, 311 is a subtractor, 312 an integrator, 313 a hold circuit, 314 an adder and 315 a coefficient circuit. FIG. 7 calculation circuit, as shown in FIG. 3, detects a reactor voltage VL and a power source current and calculates a reactor current. Herein, reactance of the reactor is assumed as L and the resistance component thereof is assumed as RL. The subtractor 311 subtracts the voltage drop VRL of the reactor resistance from the reactor voltage VL and determines a voltage applied to L. The integrator 312 integrates the output of the subtractor with the gain of 1/L for one cycle of the switching such as from time points t2 and t6 and determines a ripple current flowing through the reactor.

The hold circuit 313 holds the current value It2 of the power source at the switching cycle starting time point such as t2 and t6. The adder 314 determines L current by adding the ripple current to the power source current value It2. The coefficient circuit 315 determines the voltage drop VRL of the resistance component from the L current and applies the same to the subtractor 311. In this manner, without directly detecting the reactor current, the latter current is determined through calculation and is used for control.

Figure 8:
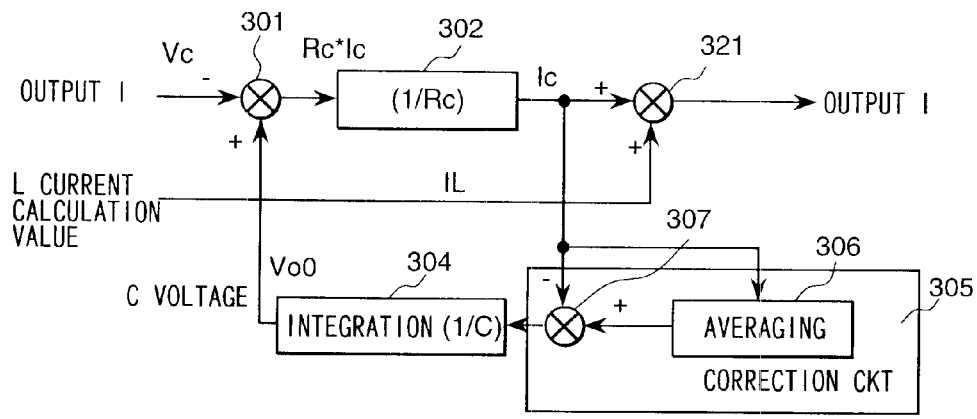
FIG. 8 is a diagram showing a structure of an output current and capacitor voltage calculating circuit representing a eighth embodiment of the present invention.

FIG. 8 shows the structure of an output current capacitor voltage calculation circuit of the present embodiment. In FIG. 8, 301 is a subtractor, 302 a coefficient circuit, 321 an adder, 304 an integrator, and 305 a correction circuit. The circuit elements in FIG. 8 designated by the same reference numerals as those in FIG. 6 are the same and operate in the same manner. The adder 321 adds the calculated L current value determined in FIG. 7 or the current detection value to the capacitor current Ic determined by calculation and determines the output current. The functions and operation of the capacitor voltage and the correction circuit are the same as in FIG. 6. Thereby, without directly detecting such as the output current and the capacitor internal voltage, such is determined through calculation and the same is used for the control.

Further, although the switching element and the circulation use switching element are constituted separately from the control circuit in the embodiments of FIGS. 1–5, they can be constituted integrally. In that case, both the size and cost of the converter can be reduced. Further, in the embodiments, the output current detector is provided at the side of the output terminal P, but can be provided at the side of output terminal N. Still further, such as correction and adjustment of circuit constants can be performed through application of external signals, and a part of the control elements can be constituted in digital elements.

According to the present invention, the reactor current and the capacitor internal voltage can be determined through calculation without directly detecting the same. IN this manner, a control circuit and a converter circuit are realized in which, by making use of these calculated values, ON/OFF control for switching elements, reverse current preventing control for circulation use switching elements and current control and frequency control which is adaptable to load can be realized. Therefore efficiency is enhanced, a ripple is reduced and a high speed response performance of a converter can be realized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A synchronized rectifier voltage step down DC-DC converter, comprising:
   a first switching element and a circulation use switching element connected in series between DC input terminals of the DC-DC converter;
   a reactor and a capacitor connected in series between a junction of the switching element and the circulation use element, and a lower potential terminal of the DC input terminals; and
   a control circuit which controls operation of the first switching element and the circulation use switching element; wherein
   through ON/OFF control of the first switching element and the circulation use switching element a DC output is obtained at terminals of the capacitor;
   the control circuit includes a first calculation circuit which calculates current flowing through the reactor; and
   the first switching element and the circulation use switching element are controlled as a function of calculated current flowing through the reactor.

2. The DC-DC converter of claim 1, wherein:
   the control circuit is further provided with a second calculation circuit which calculates voltage of the capacitor; and
   the first switching element and the circulation use switching element are controlled as a function of the calculated current flowing through the reactor, and calculated voltage of the capacitor.

3. The DC-DC converter of claim 2, wherein:
   the control circuit is further provided with a third calculation circuit that estimates output current; and
   the first switching element and the circulation use switching element are controlled as a function of the calculated current flowing through the reactor, the calculated voltage of the capacitor and calculated output current value.

4. The DC-DC converter of claim 1, wherein a PWM control of the switching element and a reverse current flow preventing control of the circulation use element are performed as a function of the calculated current value of the reactor.

5. The DC-DC converter of claim 2, wherein PWM control of the first switching element and reverse current flow preventing control of the circulation use switching element are performed based on the calculated current value flowing through the reactor.

6. The DC-DC converter of claim 3, wherein PWM control of the first switching element and reverse current flow preventing control of the circulation use switching element are performed based on the calculated current value flowing through the reactor.

7. The DC-DC converter of claim 2, comprising a plurality of first switching elements, a plurality of circulation use switching elements, a plurality of drive circuits for the plurality of first switching elements and a plurality of drive circuits for the plurality of circulation use switching elements, wherein a number of elements to be operated is increased or decreased as a function of the calculated current flowing through the reactor.

8. The DC-DC converter of claim 3, comprising a plurality of first switching elements, a plurality of circulation use switching elements, a plurality of drive circuits for the plurality of first switching elements and a plurality of drive circuits for the plurality of circulation use switching elements, wherein a number of elements to be operated is increased or decreased as a function of the calculated current flowing through the reactor.

9. The DC-DC converter of claim 3, wherein when both the output current or the calculated output current value and the calculated reactor current value detect a low load condition, DC-DC converter is changed over to a series dropper operation.

10. The DC-DC converter of claim 2, wherein:
a plurality of first switching elements and a plurality of circulation use switching elements are provided;
a number of elements to be operated is increased or decreased as a function of the calculated reactor current value; and
when both the output current or the calculated output current value and the calculated reactor current value detect a low load condition, DC-DC converter is changed over to a series dropper operation.

11. The DC-DC converter of claim 3, wherein:
a plurality of first switching elements and a plurality of circulation use switching elements are provided;
a number of elements to be operated is increased or decreased as a function of the calculated reactor current value; and
when both the output current or the calculated output current value and the calculated reactor current value detect a low load condition, DC-DC converter is changed over to a series dropper operation.

12. The DC-DC converter of claim 4, wherein when the output current or the calculated output current value detects a light load condition, an on interval of PWM is controlled by the calculated reactor current value and an off interval of PWM is controlled by the calculated capacitor voltage.

13. The DC-DC converter of claim 1, wherein the reactor current calculation circuit in the control circuit calculates the reactor current from detected values of output voltage and current of the DC-DC converter, and a constant of the capacitor.

14. The DC-DC converter of claim 2, wherein the reactor current calculation circuit in the control circuit calculates the reactor current from detected values of output voltage and current of the DC-DC converter, and a constant of the capacitor.

15. The DC-DC converter of claim 3, wherein the reactor current calculation circuit in the control circuit calculates the reactor current from detected values of reactor voltage and input current and a constant of the reactor.

16. The DC-DC converter of claim 13, wherein:
the reactor current calculation circuit in the control circuit includes a correction circuit which causes the average voltage value of the capacitor during steady state to coincide with the average value of the output voltage or the average current value of the capacitor to be zero; and
the reactor current and the capacitor voltage are calculated from detected values of output voltage and current and a constant of the capacitor.

17. The DC-DC converter of claim 14, wherein:
the reactor current calculation circuit in the control circuit includes a correction circuit which causes the average voltage value of the capacitor during steady state to coincide with the average value of the output voltage or the average current value of the capacitor to be zero; and
the reactor current and the capacitor voltage are calculated from detected values of output voltage and current and a constant of the capacitor.

18. The DC-DC converter of claim 3, wherein a capacitor voltage and output current calculation circuit in the control circuit calculates the capacitor voltage and the output current from the reactor current value calculated from detected values of output voltage and current and a constant of the capacitor, voltage detected output and a constant of the capacitor.

19. The DC-DC converter of claim 18, wherein the capacitor voltage and output current calculation circuit includes a correction circuit which causes an average voltage value of the capacitor during steady state to coincide with an average value of the output voltage, or the average current value of the capacitor to be zero.

20. The DC-DC converter of claim 12, wherein the control circuit commences the on interval of PWM at a time point when the reactor current or calculated value thereof builds up to a value of a predetermined multiple of the output current or the calculated value thereof and commences the off interval of PWM at a time point when the capacitor voltage or calculated value thereof or the output voltage falls to a predetermined value.

21. The DC-DC converter of claim 20, wherein the control circuit controls a comparing value with the reactor current or a calculated value thereof by modifying a predetermined multiplication rate multiplied to the output current or the calculation value thereof depending on the output current or the calculation value thereof.

22. The DC-DC converter of claim 20, wherein the control circuit changes over a comparing value with the reactor current or the calculation value thereof by an external signal.

* * * * *